United States Patent
Long et al.

(10) Patent No.: US 8,515,053 B2
(45) Date of Patent: Aug. 20, 2013

(54) METHOD FOR CHANGING SESSION MEDIA, METHOD FOR ESTABLISHING A CALL, AND EQUIPMENT THEREOF

(75) Inventors: Shuiping Long, Beijing (CN); Yaoping Luo, Toyko (JP)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 13/542,196

(22) Filed: Jul. 5, 2012

(65) Prior Publication Data

US 2012/0275384 A1     Nov. 1, 2012

Related U.S. Application Data

(63) Continuation of application No. 12/424,976, filed on Apr. 16, 2009, which is a continuation of application No. PCT/CN2008/071017, filed on May 20, 2008.

(30) Foreign Application Priority Data

May 31, 2007   (CN) .......................... 2007 1 0105296

(51) Int. Cl.
*H04L 12/56*      (2006.01)
*H04L 12/26*      (2006.01)
*H04W 88/02*     (2009.01)
*H04W 4/16*       (2009.01)
*H04W 76/02*     (2009.01)
*H04M 3/42*       (2006.01)
*G06F 15/16*      (2006.01)

(52) U.S. Cl.
USPC ........... 379/352; 370/259; 370/271; 370/356; 370/401; 370/465; 379/201.01; 379/207.02; 455/414.1; 455/417; 455/450; 709/227; 709/228

(58) Field of Classification Search
USPC ......... 370/259, 271, 352–356, 401, 465–467; 455/414.1–417, 450; 379/207.02, 201.01; 709/227–228
See application file for complete search history.

(56) References Cited

U.S. PATENT DOCUMENTS 5,970,134 A * 10/1999 Highland et al. ........ 379/265.02
8,139,735 B2 * 3/2012 Cai et al. .................. 379/114.01
(Continued)

FOREIGN PATENT DOCUMENTS

CN     1750400 A     3/2006
CN     1756242 A     4/2006
(Continued)

OTHER PUBLICATIONS

Nakada et al. (WO 2008/120028 A1) Oct. 2008.*
(Continued)

*Primary Examiner* — Asad Nawaz
*Assistant Examiner* — Wutchung Chu
(74) *Attorney, Agent, or Firm* — Leydig, Voit & Mayer, Ltd.

(57) ABSTRACT

A method for changing ICS session media includes: receiving a media type change request comprising a new media type sent from one of a terminal equipment, a mobile switching center (MSC), or a second party; releasing a circuit-switched (CS) call leg based on an original media type between an IMS CS control function (ICCF) and the terminal equipment; establishing a CS call leg based on the new media type between the ICCF and the terminal equipment; and updating the media type of a second call leg between the ICCF and a second party into the new media type or establishing a second call leg based on the new media type between the ICCF and the second party.

2 Claims, 13 Drawing Sheets

(56) References Cited

U.S. PATENT DOCUMENTS

| | | | |
|---|---|---|---|
| 2002/0150083 A1 | 10/2002 | Fangman et al. | |
| 2003/0027595 A1 | 2/2003 | Ejzak | |
| 2004/0028037 A1* | 2/2004 | Rasanen et al. | 370/354 |
| 2006/0142010 A1* | 6/2006 | Tom et al. | 455/445 |
| 2006/0194584 A1 | 8/2006 | Henttonen et al. | |
| 2007/0195802 A1* | 8/2007 | Kallio et al. | 370/401 |
| 2007/0291776 A1* | 12/2007 | Kenrick et al. | 370/401 |
| 2008/0037566 A1 | 2/2008 | Rasanen | |
| 2008/0049725 A1* | 2/2008 | Rasanen | 370/352 |
| 2008/0102815 A1 | 5/2008 | Sengupta et al. | |
| 2008/0108338 A1 | 5/2008 | Herrero Veron et al. | |
| 2008/0137646 A1 | 6/2008 | Agarwal et al. | |
| 2008/0152115 A1 | 6/2008 | Belling | |
| 2008/0205381 A1 | 8/2008 | Zhu et al. | |
| 2008/0239996 A1 | 10/2008 | Lohmar et al. | |
| 2009/0245496 A1 | 10/2009 | Maione et al. | |
| 2009/0290573 A1 | 11/2009 | Belling et al. | |
| 2009/0313318 A1 | 12/2009 | Dye et al. | |
| 2009/0323656 A1 | 12/2009 | Mahdi | |
| 2010/0034166 A1* | 2/2010 | Olvera-Hernandez | 370/331 |
| 2010/0134590 A1* | 6/2010 | Lindstrom et al. | 348/14.11 |
| 2012/0063582 A1 | 3/2012 | Naqvi et al. | |

FOREIGN PATENT DOCUMENTS

| | | |
|---|---|---|
| CN | 1832471 A | 9/2006 |
| CN | 1897578 A | 1/2007 |
| CN | 1949752 A | 4/2007 |
| WO | 2005027460 A1 | 3/2005 |
| WO | 2006079358 A1 | 8/2006 |
| WO | 2006090266 A1 | 8/2006 |
| WO | WO 2007041929 A1 | 4/2007 |

OTHER PUBLICATIONS

International Search Report in corresponding International Patent Application No. PCT/CN2008/071017 (Sep. 4, 2008).

Written Opinion of the International Searching Authority in corresponding International Patent Application No. PCT/CN2008/071017 (Sep. 4, 2008).

Supplementary Search Report in corresponding European Patent Application No. 08748623.9 (Dec. 22, 2009).

$3^{rd}$ Office Action in corresponding Chinese Patent Application No. 200710105296.3 (Mar. 3, 2011).

$1^{st}$ Office Action in corresponding European Patent Application No. 08748623.9 (Jan. 28, 2010).

"3GPP TR 23.801—Technical Specification Group Services and Systems Aspects; Potential Mechanisms for CS Domain Video and Voice Service Improvements (Release 6)," Technical Report, Jun. 2004, V1.0.0, $3^{rd}$ Generation Partnership Project, Valbonne, France.

"3GPP TR 23.892—Technical Specification Group Services and Systems Aspects; IP Multimedia System (IMS) Centralized Services (Release 8)," Technical Report, May 2007, V0.5.5, $3^{rd}$ Generation Partnership Project, Valbonne, France.

"3GPP TR 23.903—Technical Specification Group Services and System Aspects; Redial Solution for Voice-Video Switching (Release 6)," Technical Report, Mar. 2005, V6.1.0, $3^{rd}$ Generation Partnership Project, Valbonne, France.

$1^{st}$ Office Action in related U.S. Appl. No. 12/424,976 (Jun. 22, 2012).

"TS 23.172—Universal Mobile Telecommunications System (UMTS); Technical Realization of Circuit Switched (CS) Multimedia Service; UDI/RDI Fallback and Service Modification; Stage 2 (Release 5)," 3GPP Technical Specification, Jun. 2002, V5.0.0, 3GPP, Valbonne, France.

$2^{nd}$ Office Action in corresponding U.S. Appl. No. 12/424,976 (Oct. 25, 2012).

$3^{rd}$ Office Action in corresponding U.S. Appl. No. 12/424,976 (Feb. 25, 2013).

"TR 23.801—$3^{rd}$ Generation Partnership Project; Technical Specification Group Services and System Aspects; Potential Mechanisms for CS Domain Video and Voice Service Improvements (Release 6)," Jun. 2004, V1.0.0, 3GPP, Valbonne, France.

* cited by examiner

METHOD FOR CHANGING SESSION MEDIA, METHOD FOR ESTABLISHING A CALL, AND EQUIPMENT THEREOF

CROSS-REFERENCE TO RELATED APPLICATIONS

The application is a continuation of U.S. patent application Ser. No. 12/424,976, filed Apr. 16, 2009, which is a continuation of International Patent Application No. PCT/CN2008/071017, filed May 20, 2008. The International Patent Application claims priority to Chinese Patent Application No. 200710105296.3, filed May 31, 2007, all of which are hereby incorporated by reference in their entirety.

FIELD OF THE TECHNOLOGY

The present invention relates to an IP multimedia subsystem (IMS) centralized service (ICS) technology in the communication field, and more particularly to a method for changing ICS session media, method for establishing a call, a device for changing ICS session media, a device for establishing a call, and a terminal equipment.

BACKGROUND

Currently, mobile communication networks are generally circuit-switched (CS) and include, for example, global system for mobile communications (GSM) and code division multiple access (CDMA). Operators have established comparatively perfect and abundant service platforms based on the CS network. Among them, a mobile switching center (MSC) is responsible for call routing and service logic execution such as call forwarding and call hold services.

The service provision of the CS network needs the support of MSC in a roaming area, which is disadvantageous to the introduction of new services. An IP multimedia sub-system (IMS) is a package-switched (PS) based service network and the service provision thereof is irrelevant to the roaming area, which is advantageous to the introduction of new multimedia services. The IMS supports a user equipment (UE) to access an IMS network via various PS access networks (for example, a general packet radio service (GPRS) access network) to carry out IMS multimedia services.

The PS-based IMS network is a development trend for communication networks in the future, but the IMS network is also a relatively complex network. It can be predicted that the full deployment of the PS-based IMS network may not be completed in a short time, and meanwhile, it is impossible for all users of the CS network to start using new IMS terminals in a short time, so that the CS network will coexist with the IMS network for a long time. Therefore, the CS network and the IMS network need to be operated at the same time.

In the evolution towards the IMS network, the 3rd Generation Partnership Project (3GPP) raises an issue of IMS centralized service (ICS), requiring to realize that a UE establishes an IMS call by bearing a voice or visual phone (VP) media on the CS network and meanwhile a service processing logic in the MSC is weakened or removed. The UE receives/transmits control signaling related to the IMS call by a newly introduced IMS CS control channel (ICCC). The ICCC may be borne by an unstructured supplementary service data (USSD) message and called ICCC-cs or borne by PS and called ICCC-ps.

An existing calling flow of establishing an ICS call via a CS network includes the following steps.

In Steps 101 to 104, a terminal equipment establishes an ICCC control channel with an IMS CS control function (ICCF) and sends the number of a called party to the ICCF via the ICCC control channel. Steps 101 to 104 are described in detail below.

In Step 101, the terminal equipment sends a session invitation (Invite) to the ICCF. The session invitation message includes the phone number of the called party, i.e., the number of a second party. The session invitation may be transmitted via a USSD or PS network.

It is understood that, the employed PS network may be a GPRS or any other packet access network, and the specific transmission mode may be selected according to network services subscribed by the user terminal.

In Step 102, the ICCF returns a provisional response message (183) that may include the number of the ICCF. The number of the ICCF may also be pre-configured at the terminal equipment, and thus does not need to be returned in this step.

In Step 103, the terminal equipment sends a provisional response acknowledgement (PRACK) message to the ICCF.

In Step 104, the ICCF returns a 200OK to acknowledge the provisional acknowledgement message.

In Step 105, the terminal equipment establishes a CS call leg with the ICCF.

In Step 106, the ICCF establishes a second call leg with the called party.

In Step 107, the ICCF establishes a call connection between the terminal equipment and the second party by binding the call leg established with the terminal equipment and the call leg established with the second party.

Here, the ICCF may be regarded as a back-to-back-user-agent (B2BUA) equivalent to two UEs bonded together. The first call leg established between the ICCF and the terminal equipment and the second call leg established between the ICCF and the called party are independent from each other, so that when one call leg is disconnected, the other call leg can exist independently. The establishments of the first call leg and the second call leg may be triggered by each other. During the establishment, the signaling exchange and media connection between the terminal equipment and the second party are realized, and the conversation between the terminal equipment and the second party is also realized.

A called flow of establishing an IMS call via a CS network in the ICS manner is similar to the above calling flow, and thus the details will not be described herein again.

The above technical scheme may establish the IMS call by the CS network, but during the conversation between the calling party and the called party or during the process of setting up the call, the circumstance that the calling party or the called party requires to change the media type occurs frequently. Though the IMS allows arbitrary deletion and addition of various media (voice, VP, text, etc.) in the process of a call, network equipments of most existing CS networks do not yet support the conversion of the media type after the call is set up. Therefore, in the above ICS scheme, after the user establishes a call connection with the IMS by CS, the user's experience of services is degraded due to the limitation of the current CS network that the media type of the call cannot be changed. Release5 (R5) defined by 3GPP enables the CS network to change the media type of the session during the session, but the existing CS network and equipments thereof need to be upgraded on a large scale, which results in a tremendous upgrading cost and is difficult to be deployed.

SUMMARY

Embodiments of the invention is directed to a method for changing ICS session media, method for establishing a call, a device for changing ICS session media, a device for establishing a call, and a terminal equipment, capable of changing a media type.

Therefore, an embodiment of the invention provides a method for changing ICS session media including the following.

A media type change request including a new media type is received from a terminal equipment or a mobile switching center (MSC), a circuit-switched (CS) call leg based on an original media type between a CS control function (ICCF) and the terminal equipment is released, a CS call leg based on the new media type is established between the ICCF and the terminal equipment, and a media type of a second call leg between the ICCF and a second party is updated into the new media type.

Or, a media type change request including a new media type is received from a second party, a media type of a second call leg between an ICCF and the second party is updated into the new media type, a CS call leg based on an original media type between the ICCF and a terminal equipment is released, and a CS call leg based on the new media type is established between the ICCF and the terminal equipment.

An embodiment of the invention provides a method for establishing a call including the following.

A CS call leg based on an original media type is established between an ICCF and a terminal equipment.

A second party is requested to establish a second call leg based on the original media type.

A media type change request including a new media type is received from the second party.

The CS call leg established between the ICCF and the terminal equipment is released.

A CS call leg based on the new media type is established between the ICCF and the terminal equipment.

A second call leg based on the new media type is established between the ICCF and the second party.

An embodiment of the invention provides a method for changing ICS session media including the following.

A media negotiation between a terminal equipment and a second party is controlled via an established ICCC.

A CS call leg based on a negotiated media type is established between an ICCF and the terminal equipment.

A second call leg based on the negotiated media type is established between the ICCF and the second party.

The CS call leg established with the terminal equipment and the second call leg established with the second party are bound, and a call connection is established between the terminal equipment and the second party.

Accordingly, an embodiment of the invention provides a device for changing ICS session media including a receiving unit and a media type change unit.

The receiving unit is adapted to receive a media type change request including a new media type sent from a terminal equipment or an MSC or a second party.

The media type change unit is adapted to release a CS call leg based on an original media type established between the ICCF and the terminal equipment, reestablish a CS call leg based on the new media type between the ICCF and the terminal equipment, and update a media type of a second call leg between the ICCF and the second party into the new media type after the receiving unit receives the media type change request.

Another embodiment of the invention provides a device for establishing a call including a call establishing unit, an update request receiving unit, and a call updating unit.

The call establishing unit is adapted to establish a CS call leg based on an original media type between an ICCF and a terminal equipment, and request a second party to establish a second call leg based on the original media type.

The update request receiving unit is adapted to receive a media type change request including a new media type sent from the second party.

The call updating unit is adapted to release the CS call leg based on the original media type established between the ICCF and the terminal equipment, establish a CS call leg based on the new media type between the ICCF and the terminal equipment, and establish a second call leg based on the new media type between the ICCF and the second party after the update request receiving unit receives the media type change request.

Another embodiment of the invention provides a device for changing ICS session media including a media negotiation agent unit and a call establishing unit.

The media negotiation agent unit is adapted to control a terminal equipment to perform a media negotiation with a second party via an ICCC.

The call setup unit is adapted to establish a CS call leg based on a negotiated media type between an ICCF and the terminal equipment, establish a second call leg based on the negotiated media type between the ICCF and the second party, and establish a call connection between the terminal equipment and the second party by binding the call leg established with the terminal equipment and the call leg established with the second party.

Another embodiment of the invention provides a terminal equipment including a media type change unit and a call leg reestablishment unit.

The media type change unit is adapted to change a media type used in a conversation with the second party.

The call leg reestablishment unit is adapted to release a CS call leg based on an original media type established between the terminal equipment and an ICCF, and establish a CS call leg based on the changed new media type between the terminal equipment and the ICCF after the media type change unit changes the media type.

In an embodiment, the present invention provides a terminal equipment including a media negotiation unit and a call leg establishment unit.

The media negotiation unit is adapted to perform a media negotiation with a second party via an ICCC established with an ICCF.

The call leg establishment unit is adapted to establish a CS call leg based on a media type after the media negotiation with the ICCF.

Through the above technical schemes, the present invention achieves the following beneficial effects.

According to the embodiments of the invention, in the ICS session established by CS, when a change of the media type of the call is triggered, the CS call leg based on the original media type established between the terminal equipment and the ICCF is released, the CS call leg based on the new media type is reestablished between the terminal equipment and the ICCF, and the call connection is established between the terminal equipment and the second party by binding the reestablished CS call leg and the second call leg established between the ICCF and the second party, thereby changing the media type in the ICS call established by CS. As the mechanism of reestablishing a call leg is employed in the CS network, compared with the conventional art, the requirements for the CS network are lowered, the large-scale upgrade of the CS network equipments in the existing technical scheme is avoided, the network construction cost is reduced, and the network universality is enhanced.

DETAILED DESCRIPTION

The invention provides a method for controlling a call, an IMS CS control device, and a terminal equipment, capable of changing a media type in an ICS call established by CS. The call control method, the IMS CS control device, and the terminal equipment provided in the embodiments of the invention are described in detail below.

Figure 1:
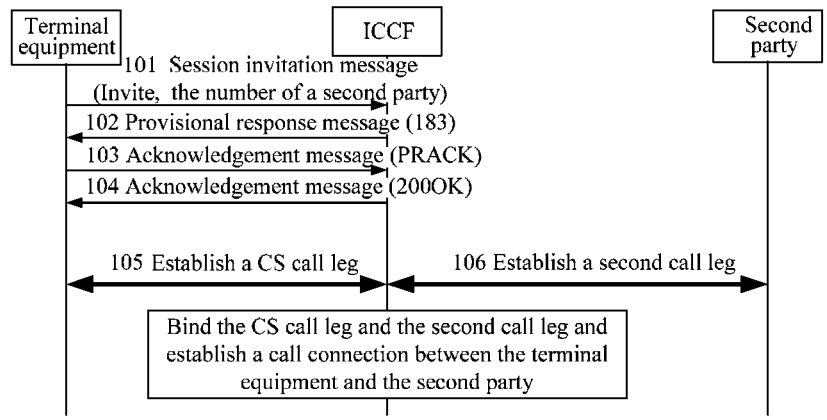
FIG. 1 is a chart illustrating a calling flow of establishing an ICS call via a CS network.
Figure 2:
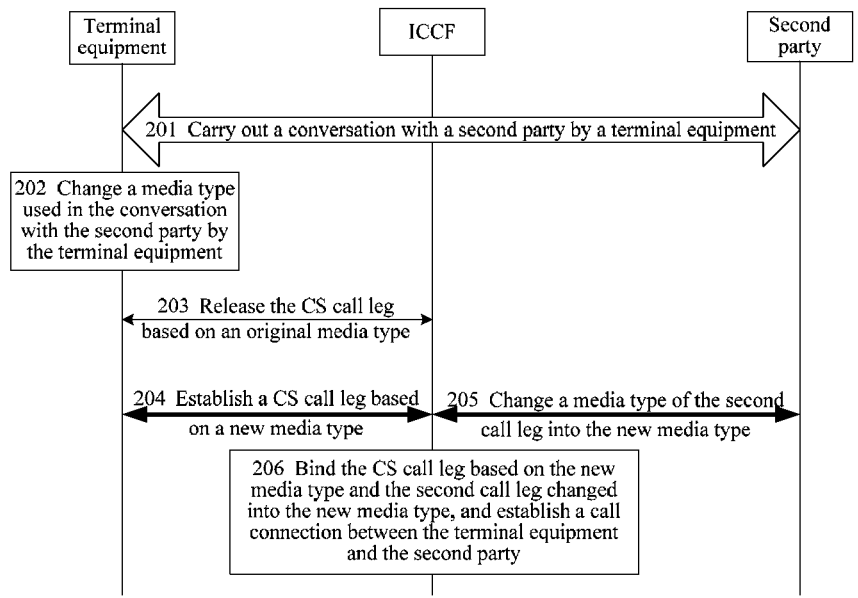
FIG. 2 is a flow chart of a method for controlling a call according to a first embodiment of the invention.

A signaling flow chart of a method for controlling a call according to a first embodiment is shown in FIG. 2. The method includes the following steps.

In Step 201, a terminal equipment carries out a conversation with a second party through a CS call leg established between the terminal equipment and an ICCF and a second call leg established between the ICCF and the second party.

In one embodiment of the invention, the terminal equipment is a network equipment capable of communicating based on CS and may be, for example, a mobile phone, a fixed-line phone, a network computer, a server, and the like.

The second party includes a peer terminal equipment establishing a call with the terminal equipment and an access network thereof. The access network may be a PS or CS access network, which is not limited in the invention.

In Step 202, the terminal equipment changes a media type used in the conversation with the second party.

In one embodiment of the invention, the media type may include an audio type, a VP type, and a file type.

In Step 203, the CS call leg based on an original media type established between the terminal equipment and the ICCF is released.

In this embodiment, the releasing the CS call leg between the terminal equipment and the ICCF may be initiated by the terminal equipment. For example, the releasing the CS call leg includes the following steps.

The terminal equipment sends a call disconnect (Disconnect) message to an MSC that serves the terminal equipment.

The MSC sends a release (REL) message to a media gateway controller (MGCF).

The MGCF sends a session disconnect (BYE) message to the ICCF.

The ICCF returns an acknowledgement (200OK) message of the BYE message to the MGCF.

The MGCF returns a release complete (REL COMP) message to the MSC.

The MSC returns a release (Release) message to the terminal equipment to acknowledge that the call leg is released.

It is understood that, the releasing the CS call leg between the terminal equipment and the ICCF may also be initiated by the ICCF. For example, the terminal equipment sends a media type change request to the ICCF via an ICCC, and then the ICCF initiates a request for the release of the CS call leg established with the terminal equipment.

In Step 204, a CS call leg based on a new media type is established between the terminal equipment and the ICCF.

In this embodiment, the establishing the CS call leg based on the new media type is implemented as follows.

The terminal equipment sends a call setup (Setup) message including the new media type to the MSC.

The MSC sends an initial address (IAM) message including the new media type to the MGCF.

The MGCF sends a session invitation (Invite) message including the new media type to the ICCF. When forwarding the new media type to the ICCF, the MGCF adaptively converts a coding format of the new media type according to practical conditions so as to accommodate the media type to an IMS network.

The ICCF receives the Invite message. It is understood that, when the ICCF receives the Invite message, the changing a media type of the second call leg to the new media type in Step 205 of this embodiment may be triggered, and upon a completion of the changing the media type of the second call leg to the new media type, the ICCF returns the 200OK message to the MGCF for acknowledgement.

The MGCF returns an off-hook answer (ANM) message to the MSC.

The MSC returns a connect (Connect) message to the terminal equipment, and the establishment of the CS call leg is completed.

It is understood that, the establishing the CS call leg based on the new media type in Step 204 may also be implemented as follows: The ICCF receives the new media type of the terminal equipment via the ICCC, and after the CS call leg is disconnected, the ICCF re-initiates the establishing the CS call leg based on the new media type.

In Step 205, the media type of the second call leg is changed to the new media type.

In this embodiment, the changing the media type of the second call leg to the new media type is implemented as follows.

The ICCF sends a session re-invitation (Re-Invite) message or an update (Update) message to the second party.

The second party returns a response message of the Re-Invite message or the Update message to the ICCF to accept the new media type.

It is understood that, the media type may also be changed by reestablishing the second call leg in the following manner.

The second call leg based on the original media type between the ICCF and the second party is released.

A second call leg based on the new media type is established between the ICCF and the second party.

Steps 205 and 204 in this embodiment have no absolute order. Step 205 may be performed synchronously with the establishing the call leg based on the new media type in Step 204. For example, after the ICCF receives the Invite message from the MGCF, Step 205 is triggered, and upon a completion of the media type change of the second leg, the ICCF returns an acknowledgement message to the terminal equipment to acknowledge that the establishment of the CS call leg is completed. The acknowledgement message may be converted correspondingly by an equipment in a CS domain so as to reach the terminal equipment.

In Step 206, the ICCF establishes a call connection between the terminal equipment and the second party by binding the CS call leg based on the new media type and the second call leg changed to the new media type.

It is understood that, the binding the CS call leg and the second call leg may be performed during the establishment of the call leg, and mainly includes realizing a media connection between the terminal equipment and the second party.

According to the first embodiment of the invention, in the ICS call established by CS, when a change of the media type of the call is triggered, the CS call leg based on the original media type established between the terminal equipment and the ICCF is released, the CS call leg based on the new media type is reestablished between the terminal equipment and the ICCF, and the call connection is established between the terminal equipment and the second party by binding the reestablished CS call leg and the second call leg established between the ICCF and the second party, thereby changing the media type in the ICS call established by CS. As the mechanism of reestablishing a call leg is employed in the CS network, compared with the conventional art, the requirements for the CS network are lowered, the large-scale upgrade of the CS network equipments in the existing technical scheme is avoided, the network construction cost is reduced, and the network universality is enhanced.

Those of ordinary skill in the art should understand that all or part of the steps in the above method according to the embodiment may be achieved by a related hardware instructed by a program. The program may be stored in a computer readable storage medium and includes the following steps when executed:

A terminal equipment carries out a conversation with a second party through a CS call leg established between the terminal equipment and an ICCF and a second call leg established between the ICCF and the second party.

If the terminal equipment changes a media type used in the conversation with the second party, the CS call leg based on an original media type established between the terminal equipment and the ICCF is released.

A CS call leg based on a new media type is established between the terminal equipment and the ICCF.

A media type of the second call leg is changed to the new media type.

The ICCF establishes a call connection between the terminal equipment and the second party by binding the CS call leg based on the new media type and the second call leg changed to the new media type.

The above-mentioned storage medium may be a read only memory (ROM), a magnetic disk, an optical disk, or the like.

Figure 3:
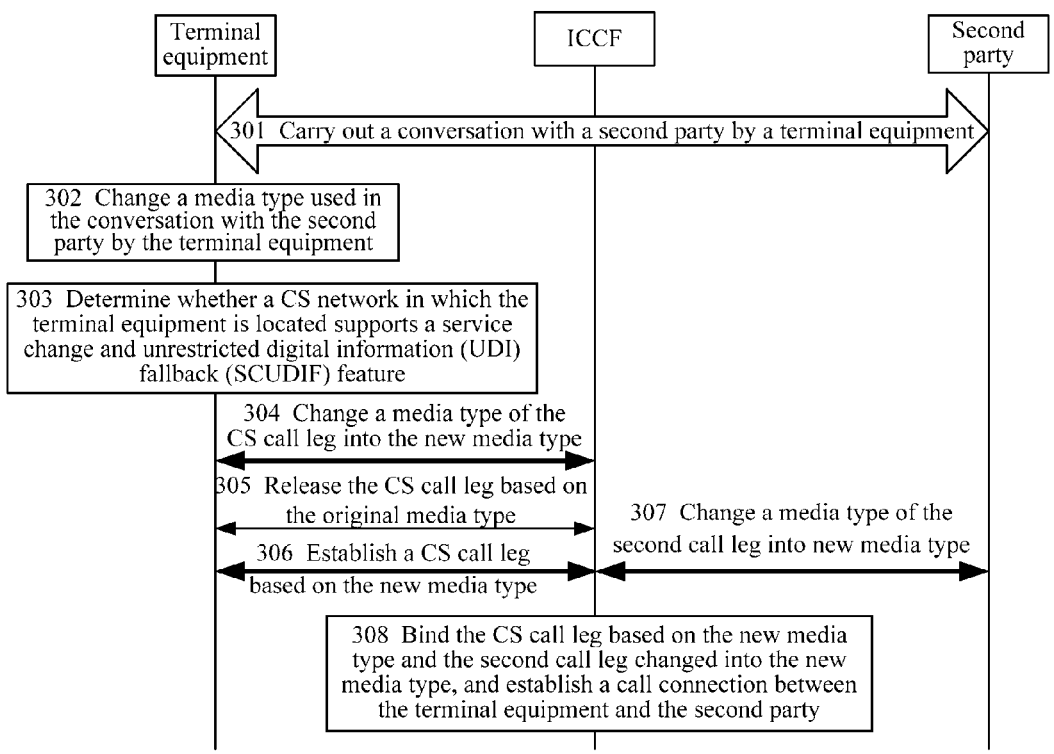
FIG. 3 is a flow chart of a method for controlling a call according to a second embodiment of the invention.

A signaling flow chart of a method for controlling a call according to a second embodiment of the invention is shown in FIG. 3. The method includes the following steps:

In Step 301, a terminal equipment carries out a conversation with a second party through a CS call leg established between the terminal equipment and an ICCF and a second call leg established between the ICCF and the second party.

In Step 302, the terminal equipment changes a media type used in the conversation with the second party.

In the embodiment of the invention, the media type may include an audio type, a VP type, and a file type.

In Step 303, it is determined whether a CS network where the terminal equipment resides supports a service change and unrestricted digital information (UDI) fallback (SCUDIF) feature, and if yes, the flow proceeds to Step 304; otherwise, the flow proceeds to Step 305.

In Step 304, the CS call leg based on an original media type is modified into a CS call leg based on the new media type by using the SCUDIF feature, and the flow proceeds to Step 307.

In Step 305, the CS call leg based on the original media type established between the terminal equipment and the ICCF is released.

In Step 306, a CS call leg based on the new media type is established between the terminal equipment and the ICCF.

In Step 307, a media type of the second call leg is changed to the new media type.

In Step 308, the ICCF establishes a call connection between the terminal equipment and the second party by binding the CS call leg based on the new media type and the second call leg changed to the new media type.

The second embodiment of the invention is different from the first embodiment in that, the determining whether the CS network supports the SCUDIF feature is added based on the first embodiment, and if the CS network supports the SCUDIF feature, it is learned that the CS switched network in which the terminal equipment is located supports a media change and thus the media type of the CS call leg established between the terminal equipment and the ICCF can be changed to the new media type in a media change manner supported by R5, so as to accelerate the media conversion.

Figure 4:
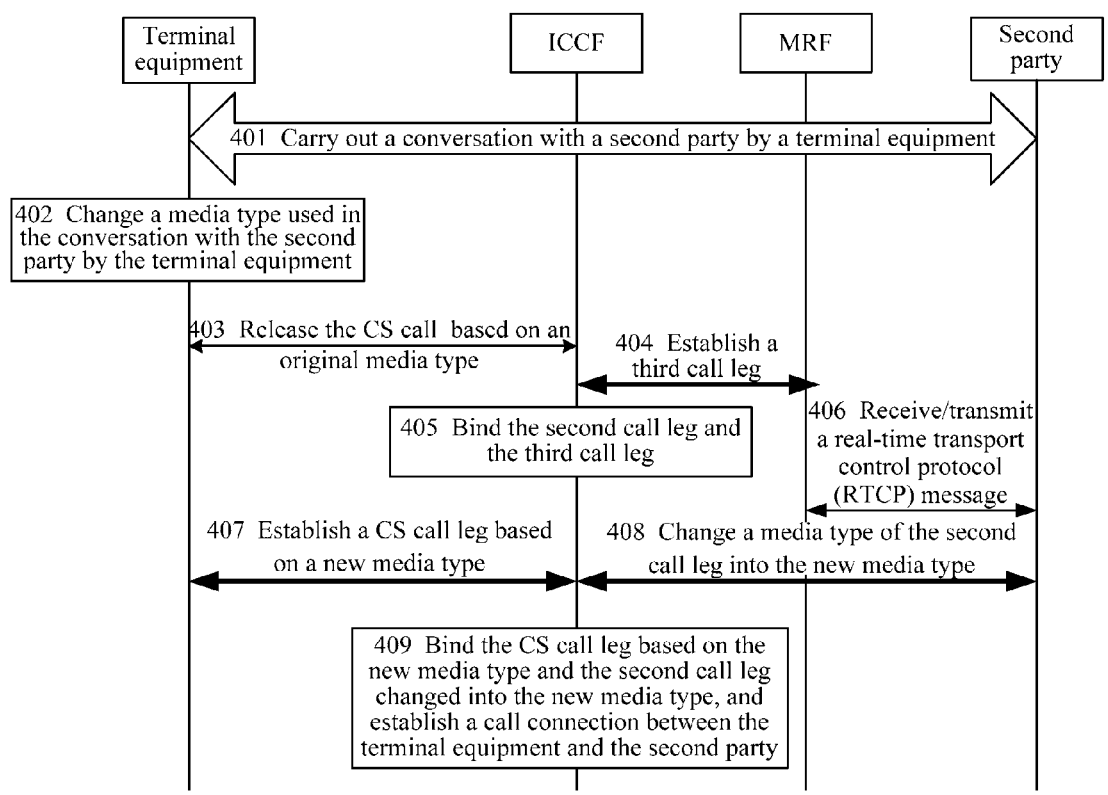
FIG. 4 is a flow chart of a method for controlling a call according to a third embodiment of the invention.

A signaling flow chart of a method for controlling a call according to a third embodiment of the present invention is shown in FIG. 4. The method includes the following steps:

In Step 401, a terminal equipment carries out a conversation with a second party through a CS call leg established between the terminal equipment and an ICCF and a second call leg established between the ICCF and the second party.

In Step 402, the terminal equipment changes a media type used in the conversation with the second party.

In the embodiment of the invention, the media type may include an audio type, a VP type, and a file type.

In Step 403, the CS call leg based on an original media type established between the terminal equipment and the ICCF is released.

The releasing the call may refer to Step 203 of the first embodiment.

In Step 404, the ICCF establishes a third call leg with a media resource function (MRF).

In Step 405, the ICCF binds the second call leg and the third call leg.

In Step 406, the MRF receives/transmits a real-time transport control protocol (RTCP) message with the second party through the third call leg and the second call leg.

As the CS call leg is released, the second party cannot receive the RTCP message controlling a real-time transport protocol (RTP) connection. The RTCP message is sent at a certain time interval, so that the call is considered failed if a reestablished CS call leg based on a new media type is not short enough and the RTCP message is not received within a certain time, and then the second party actively terminates the call leg with the ICCF. Therefore, after the CS call leg is released, the MRF is adapted to establish a call connection and receive/transmit the RTCP message with the second party in order to hold the second call leg established between the ICCF and the second party.

It is understood that, this embodiment may also realize the holding of the second call leg in the manner of notifying, by the ICCF, a media gateway control function entity to control a media gateway to receive/transmit an RTCP message with the second party as a media endpoint temporarily.

In Step 407, a CS call leg based on a new media type is established between the terminal equipment and the ICCF.

In Step 408, a media type of the second call leg is changed to the new media type.

This embodiment realizes the change of the media type in the manner of sending, by the ICCF, a session re-invitation (Re-Invite) message or an update (Update) message to the second party and returning, by the second party, a response message of the Re-Invite message or the Update message to the ICCF to accept the new media type.

In Step 409, the ICCF establishes a call connection between the terminal equipment and the second party by binding the CS call leg based on the new media type and the second call leg changed to the new media type.

In this embodiment, it may also be determined whether a CS network in which the terminal equipment is located supports an SCUDIF feature before Step 403, and if the CS network in which the terminal equipment is located supports an SCUDIF feature, the CS call leg based on the original media type is modified into a CS call leg based on the new media type by using the SCUDIF feature and the flow proceeds to Step 408; otherwise, the flow proceeds to Step 403.

The third embodiment of the invention is different from the second embodiment in that a third party replaces the terminal equipment to receive/transmit the RTCP message with the second party, which avoids the release of the call leg between the ICCF and the second party due to too-long reestablishment time during the reestablishment of the CS call leg and ensures the stability of the second call leg when the CS leg is reestablished, so that the method of this embodiment is more practical.

Figure 5:
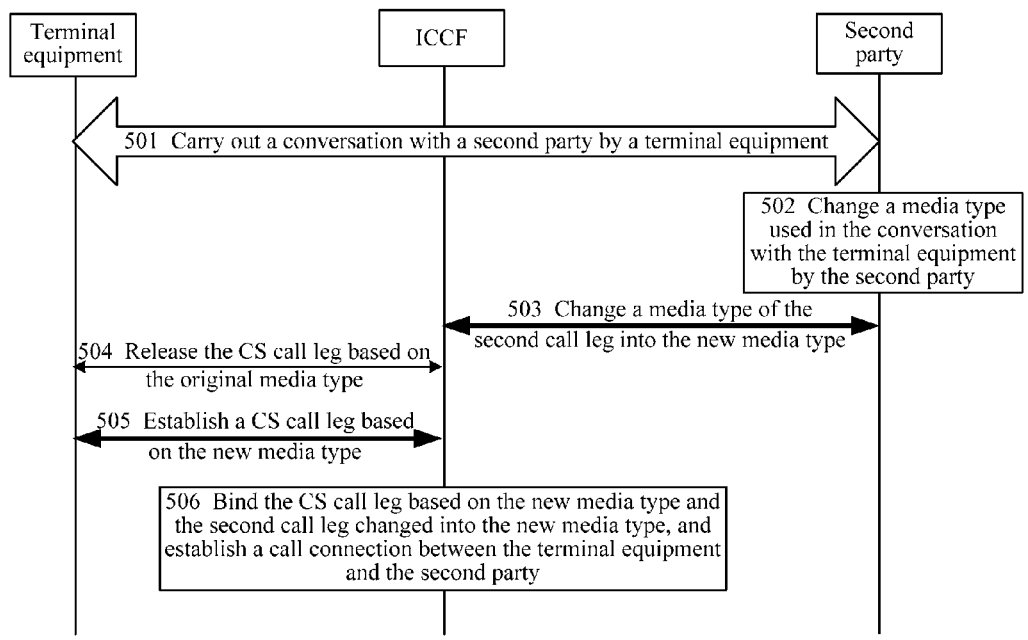
FIG. 5 is a flow chart of a method for controlling a call according to a fourth embodiment of the invention.

A signaling flow chart of a method for controlling a call according to a fourth embodiment is shown in FIG. 5. The method includes the following steps:

In Step 501, a terminal equipment carries out a conversation with a second party through a CS call leg established between the terminal equipment and an ICCF and a second call leg established between the ICCF and the second party.

In the embodiment of the invention, the terminal equipment is a network equipment capable of communicating based on CS and may be, for example, a mobile phone, a fixed-line phone, a network computer, a server, and the like. The second party includes a peer terminal equipment establishing a call with the terminal equipment and an access network thereof. The access network may be a PS or CS access network, which is not limited in the invention.

In Step 502, the second party changes a media type used in the conversation with the terminal equipment.

In an embodiment of the invention, the media type may include an audio type, a VP type, and a file type.

In Step 503, a media type of the second call leg is changed into a new media type.

In this embodiment, the changing the media type of the second call leg to the new media type is implemented as follows.

The second party sends a Re-Invite message or an Update message including the new media type to the ICCF.

The ICCF returns a response message of the Re-Invite message or the Update message to the second party to accept the new media type. It is understood that, the response message is returned after a CS call leg based on the new media type is established between the terminal equipment and the ICCF in Step 505 so as to indicate that the terminal equipment accepts the new media type.

It is understood that, the changing the media type of the second call leg to the new media type may also be implemented as follows.

The second call leg based on an original media type between the ICCF and the second party is released.

A second call leg based on the new media type is established between the ICCF and the second party.

In Step 504, the CS call leg based on the original media type established between the terminal equipment and the ICCF is released.

In this embodiment, the CS call leg between the terminal equipment and the ICCF may be initiated by the ICCF. For example, the releasing of the CS call leg includes the following steps.

The ICCF sends a session disconnect (BYE) message to an MGCF.

The MGCF sends an REL message to an MSC that serves the terminal equipment.

The MSC sends a Disconnect message to the terminal equipment.

The terminal equipment returns a release (Release) message to the MSC to acknowledge that the call leg is released.

The MSC returns an REL COMP message to the MGCF.

The MGCF returns an acknowledgement (200OK) message of the BYE message to the ICCF to acknowledge that the call leg is disconnected.

It is understood that, the CS call leg between the terminal equipment and the ICCF may also be initiated by the terminal equipment. For example, the ICCF sends a media type change request to the terminal equipment via an ICCC, and then the terminal equipment initiates a request for the release of the CS call leg established with the ICCF. The specific implementation may refer to Step 203 of the first embodiment.

In Step 505, a CS call leg based on the new media type is established between the terminal equipment and the ICCF.

In this embodiment, the establishing the CS call leg based on the new media type may be implemented as follows.

The ICCF sends a session invitation (Invite) message including the new media type to the MGCF.

The MGCF receives the Invite message and sends an initial address (IAM) message to the MSC.

The MSC sends a call setup (Setup) message to the terminal equipment.

The terminal equipment returns a connect (Connect) message to the MSC for acknowledgement.

The MSC returns an off-hook answer (ANM) message to the MGCF.

The MGCF returns the 200OK message to the ICCF for acknowledgement, and the establishment of the CS call leg is completed.

It is understood that, the establishing the CS call leg based on the new media type in Step 505 may also be implemented as follows.

The terminal equipment receives the new media type sent from the ICCF via the ICCC, and after the CS call leg is disconnected, the terminal equipment re-initiates the establishing the CS call leg based on the new media type.

In Step 506, the ICCF establishes a call connection between the terminal equipment and the second party by binding the CS call leg based on the new media type and the second call leg changed to the new media type.

The difference between the fourth embodiment of the invention and the first embodiment lies in that they are applicable to different call scenarios. The initiator of the media change in the fourth embodiment is the second party that carries out a conversation with the terminal equipment performing the CS, while the initiator of the media change in the first embodiment is the terminal equipment.

Those of ordinary skill in the art should understand that all or part of the steps in the above method according to the embodiment may be achieved by a related hardware instructed by a program. The program may be stored in a computer readable storage medium and includes the following steps when executed.

A terminal equipment carries out a conversation with a second party through a CS call leg established between the terminal equipment and an ICCF and a second call leg established between the ICCF and the second party.

The second party changes a media type used in the conversation with the terminal equipment, and a media type of the second call leg is changed into a new media type.

The CS call leg based on the original media type established between the terminal equipment and the ICCF is released.

A CS call leg based on the new media type is established between the terminal equipment and the ICCF.

The ICCF establishes a call connection between the terminal equipment and the second party by binding the CS call leg based on the new media type and the second call leg changed to the new media type.

The above-mentioned storage medium may be an ROM, a magnetic disk, an optical disk, or the like.

Figure 6:
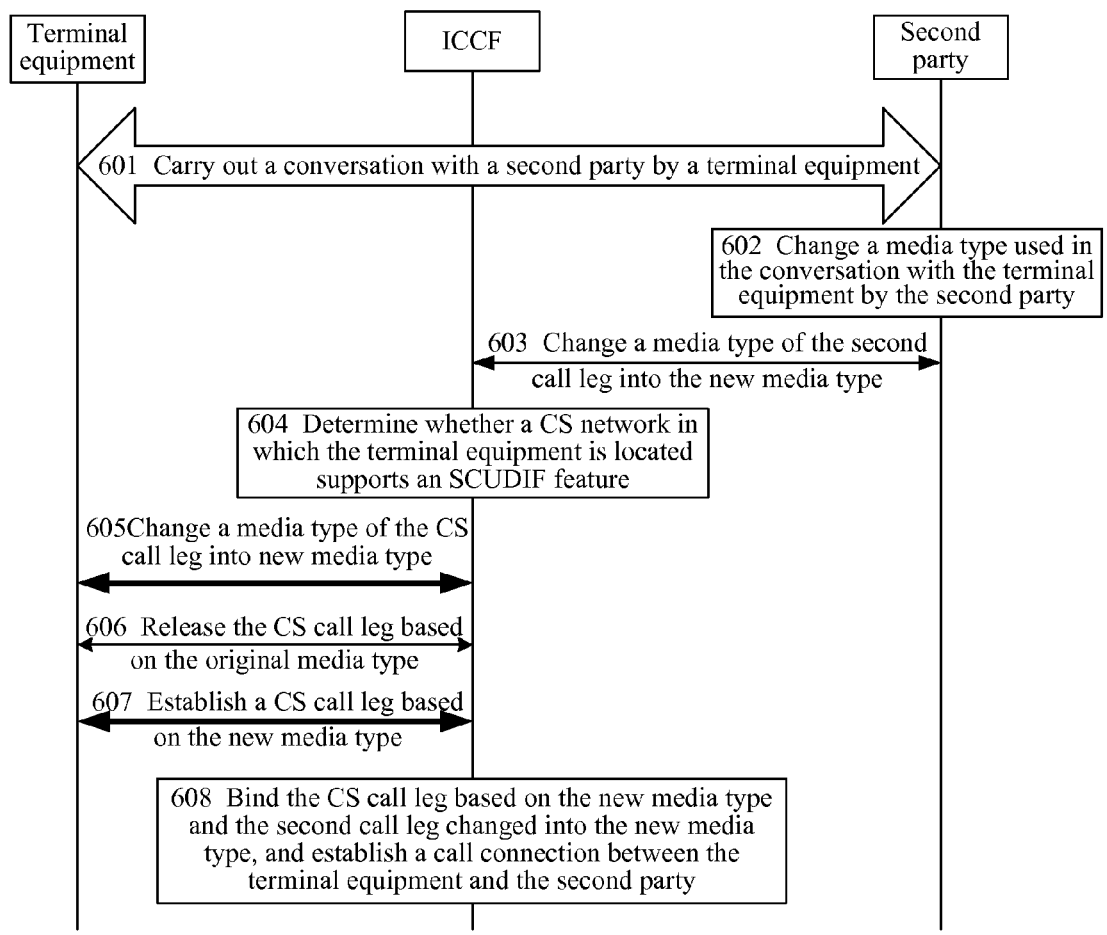
FIG. 6 is a flow chart of a method for controlling a call according to a fifth embodiment of the invention.

A signaling flow chart of a method for controlling a call according to a fifth embodiment of the invention is shown in FIG. 6. The method includes the following steps:

In Step 601, a terminal equipment carries out a conversation with a second party through a CS call leg established between the terminal equipment and an ICCF and a second call leg established between the ICCF and the second party.

In Step 602, the second party changes a media type used in the conversation with the terminal equipment.

In Step 603, a media type of the second call leg is changed into the new media type.

The changing the media type of the second call leg into the new media type may refer to Step 503 of the fourth embodiment.

In Step 604, it is determined whether a CS network in which the terminal equipment is located supports an SCUDIF feature, and if the terminal equipment is located supports an SCUDIF feature, the flow proceeds to Step 605; otherwise, the flow proceeds to Step 606.

In this embodiment, the determining whether the CS network supports the SCUDIF feature may be performed by the ICCF or the terminal equipment.

In Step 605, the CS call leg based on an original media type is modified into a CS call leg based on the new media type by using the SCUDIF feature, and the flow proceeds to Step 608.

In Step 606, the CS call leg based on the original media type established between the terminal equipment and the ICCF is released.

The releasing the CS call leg may refer to Step 504 of the fourth embodiment.

In Step 607, a CS call leg based on the new media type is established between the terminal equipment and the ICCF.

The establishing the CS call leg may refer to Step 505 of the fourth embodiment.

In Step 608, the ICCF establishes a call connection between the terminal equipment and the second party by binding the CS call leg based on the new media type and the second call leg changed into the new media type.

The difference between the fifth embodiment of the invention and the second embodiment lies in that they are applicable to different call scenarios. The initiator of the media change in the fourth embodiment is the second party that carries out a conversation with the terminal equipment performing the CS, while the initiator of the media change in the first embodiment is the terminal equipment.

Figure 7:
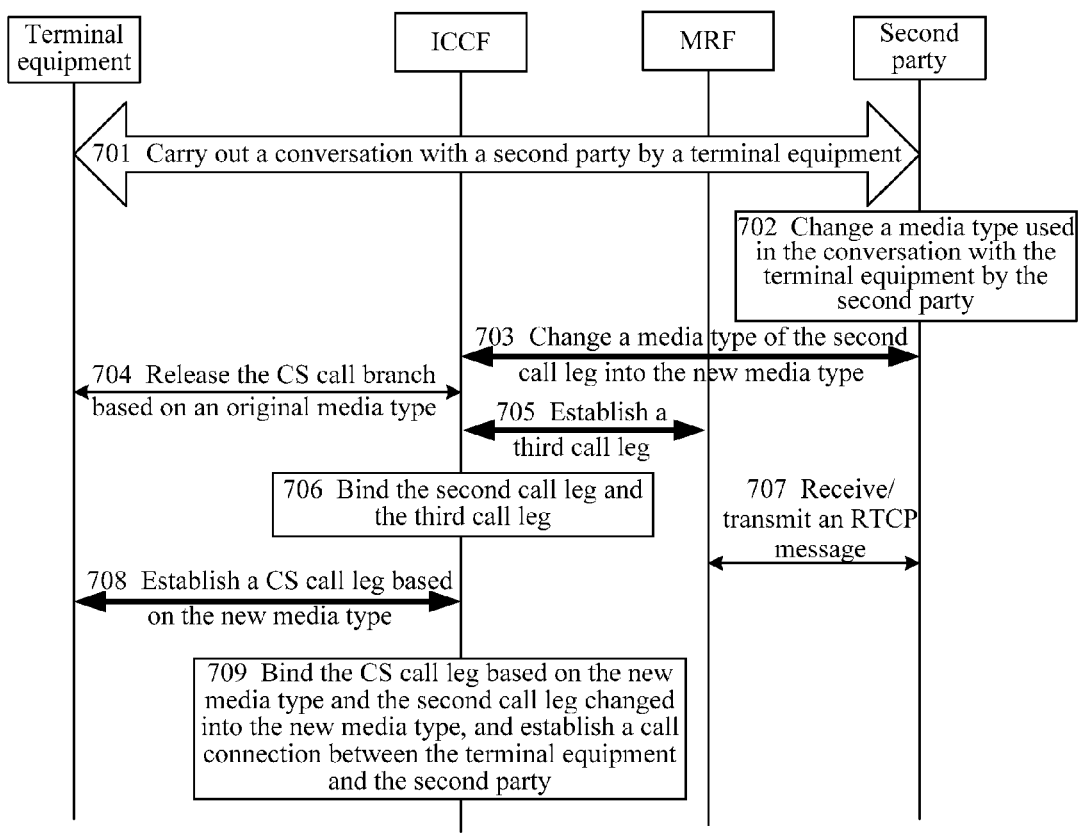
FIG. 7 is a flow chart of a method for controlling a call according to a sixth embodiment of the invention.

A signaling flow chart of a method for controlling a call according to a sixth embodiment is shown in FIG. 7. The method includes the following steps.

In Step 701, a terminal equipment carries out a conversation with a second party through a CS call leg established between the terminal equipment and an ICCF and a second call leg established between the ICCF and the second party.

In Step 702, the second party changes a media type used in the conversation with the terminal equipment.

In Step 703, a media type of the second call leg is changed into a new media type.

In this embodiment, the changing the media type of the second call leg into the new media type is implemented as follows.

The second party sends a Re-Invite message or an Update message including the new media type to the ICCF.

The ICCF returns a response message of the Re-Invite message or the Update message to the second party to accept the new media type.

In Step 704, the CS call leg based on an original media type established between the terminal equipment and the ICCF is released.

The releasing the CS call leg may refer to Step 504 of the fourth embodiment.

In Step 705, the ICCF establishes a third call leg with an MRF.

In Step 706, the ICCF binds the second call leg and the third call leg.

In Step 707, the MRF receives/transmits an RTCP message with the second party through the third call leg and the second call leg.

It is understood that, this embodiment may also realize the holding of the second call leg in the manner of notifying, by the ICCF, a media gateway control function entity to control a media gateway to receive/transmit an RTCP message with the second party as a media endpoint temporarily.

In Step 708, a CS call leg based on the new media type is established between the terminal equipment and the ICCF.

The establishing the CS call leg may refer to Step 505 of the fourth embodiment.

In Step 709, the ICCF establishes a call connection between the terminal equipment and the second party by binding the CS call leg based on the new media type and the second call leg changed into the new media type.

In this embodiment, it may also be determined whether a CS network in which the terminal equipment is located supports an SCUDIF feature before Step 704, and if the CS network in which the terminal equipment is located supports an SCUDIF feature, the CS call leg based on the original media type is modified into a CS call leg based on the new media type by using the SCUDIF feature and the flow proceeds to Step 709; otherwise, the flow proceeds to Step 704.

The difference between the sixth embodiment of the invention and the third embodiment lies in that they are applicable to different call scenarios. The initiator of the media change in the fourth embodiment is the second party that carries out a conversation with the terminal equipment performing the CS, while the initiator of the media change in the first embodiment is the terminal equipment.

Figure 8:
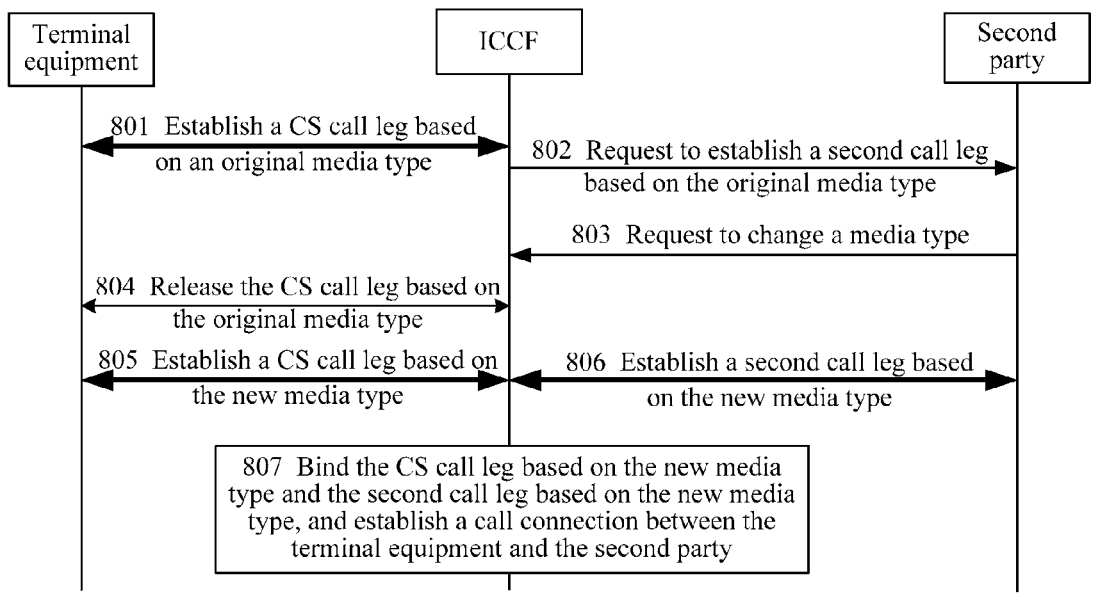
FIG. 8 is a flow chart of a method for controlling a call according to a seventh embodiment of the invention.

A signaling flow chart of a method for controlling a call according to a seventh embodiment is shown in FIG. 8. The method includes the following steps.

In Step 801, a terminal equipment establishes a CS call leg based on an original media type with an ICCF.

In this embodiment, the establishing the CS call leg based on the original media type with the ICCF by the terminal equipment may refer to Step 204 of establishing a CS call leg based on a new media type in the first embodiment.

In Step 802, the ICCF requests a second party to establish a second call leg based on the original media type.

The ICCF may request the second party to establish the second call leg based on the original media type by sending an Invite message to the second party.

In Step 803, the second party requests the ICCF to change a media type. The request includes a new media type.

It is understood that, the second party may return the request for the change of the media type by returning a response message of the Invite message to the ICCF. The returning the media type change request may be implemented by other regular messages, and the specific message may not limit the invention.

In Step 804, the CS call leg established between the terminal equipment and the ICCF is released.

The releasing the CS call leg based on the original media type established between the terminal equipment and the ICCF may refer to Step 203 of the first embodiment and Step 504 of the sixth embodiment.

In Step 805, the terminal equipment establishes a CS call leg based on the new media type with the ICCF, and the establishing the CS call leg based on the new media type may refer to Step 204 of the first embodiment and Step 505 of the fifth embodiment.

In Step 806, the ICCF establishes a second call leg based on the new media type with the second party.

In Step 807, the ICCF establishes a call connection between the terminal equipment and the second party by binding the CS call leg based on the new media type established with the terminal equipment and the second call leg established with the second party.

The difference between the seventh embodiment and the first and the fourth embodiments lies in that they are applicable to different call scenarios. In the first embodiment, the terminal equipment requests a change of the media type during the conversation between the terminal equipment in the CS network and the second party. In the fifth embodiment, the second party requests a change of the media type during the conversation between the terminal equipment in the CS network and the second party. In the seventh embodiment, the media type change is performed during a call setup between the terminal equipment and the second party.

Figure 9:
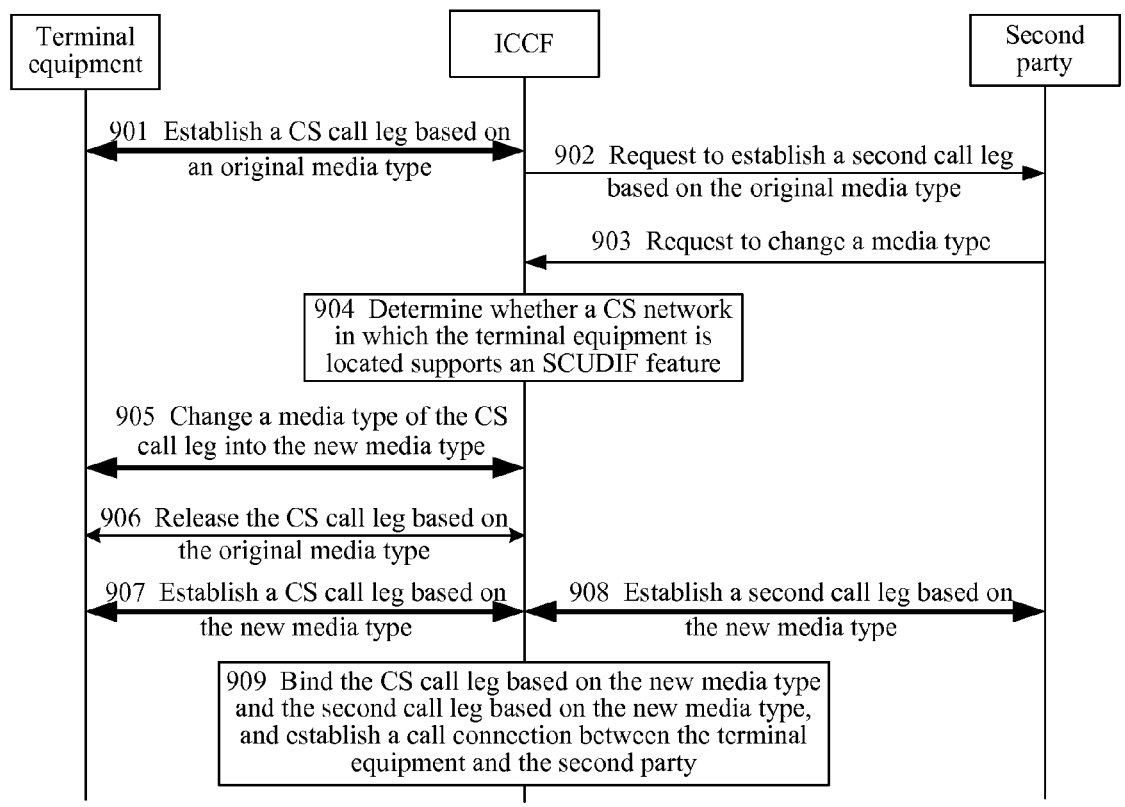
FIG. 9 is a flow chart of a method for controlling a call according to an eighth embodiment of the invention.

A signaling flow chart of a method for controlling a call according to an eighth embodiment is shown in FIG. 9. The method includes the following steps.

In Step 901, a terminal equipment establishes a CS call leg based on an original media type with an ICCF.

In this embodiment, the establishing the CS call leg based on the original media type with the ICCF by the terminal equipment may refer to Step 204 of establishing a CS call leg based on a new media type in the first embodiment.

In Step 902, the ICCF requests a second party to establish a second call leg based on the original media type.

The ICCF may request the second party to establish the second call leg based on the original media type by sending an Invite message to the second party.

In Step 903, the second party requests the ICCF to change a media type. The request includes a new media type.

It is understood that, the second party may return the request for the change of the media type by returning a response message of the Invite message to the ICCF. The returning the media type change request may be implemented by other regular messages, and the specific message may not limit the invention.

In Step 904, it is determined whether a CS network in which the terminal equipment located supports an SCUDIF, and if the CS network in which the terminal equipment located supports an SCUDIF, the flow proceeds to Step 905; otherwise, the flow proceeds to Step 906.

In Step 905, the CS call leg based on the original media type is modified into a CS call leg based on the new media type by using the SCUDIF feature, and the flow proceeds to Step 908.

In Step 906, the CS call leg established between the terminal equipment and the ICCF is released.

The releasing the CS call leg based on the original media type established between the terminal equipment and the ICCF may refer to Step 203 of the first embodiment and Step 504 of the sixth embodiment.

In Step 907, the terminal equipment establishes a CS call leg based on the new media type with the ICCF, and the establishing the CS call leg based on the new media type may refer to Step 204 of the first embodiment and Step 505 of the fifth embodiment.

In Step 908, the ICCF establishes a second call leg based on the new media type with the second party.

In Step 909, the ICCF establishes a call connection between the terminal equipment and the second party by binding the CS call leg based on the new media type established with the terminal equipment and the second call leg established with the second party.

The eighth embodiment of the invention is different from the seventh embodiment in that, the determining whether the network supports the SCUDIF feature is added based on the seventh embodiment, and if the network supports the SCUDIF feature, it is learned that the CS switched network in which the terminal equipment is located supports a media change and thus the media type of the CS call leg established between the terminal equipment and the ICCF can be changed into the new media type in a media change manner supported by R5, so as to accelerate the media conversion.

Figure 10:
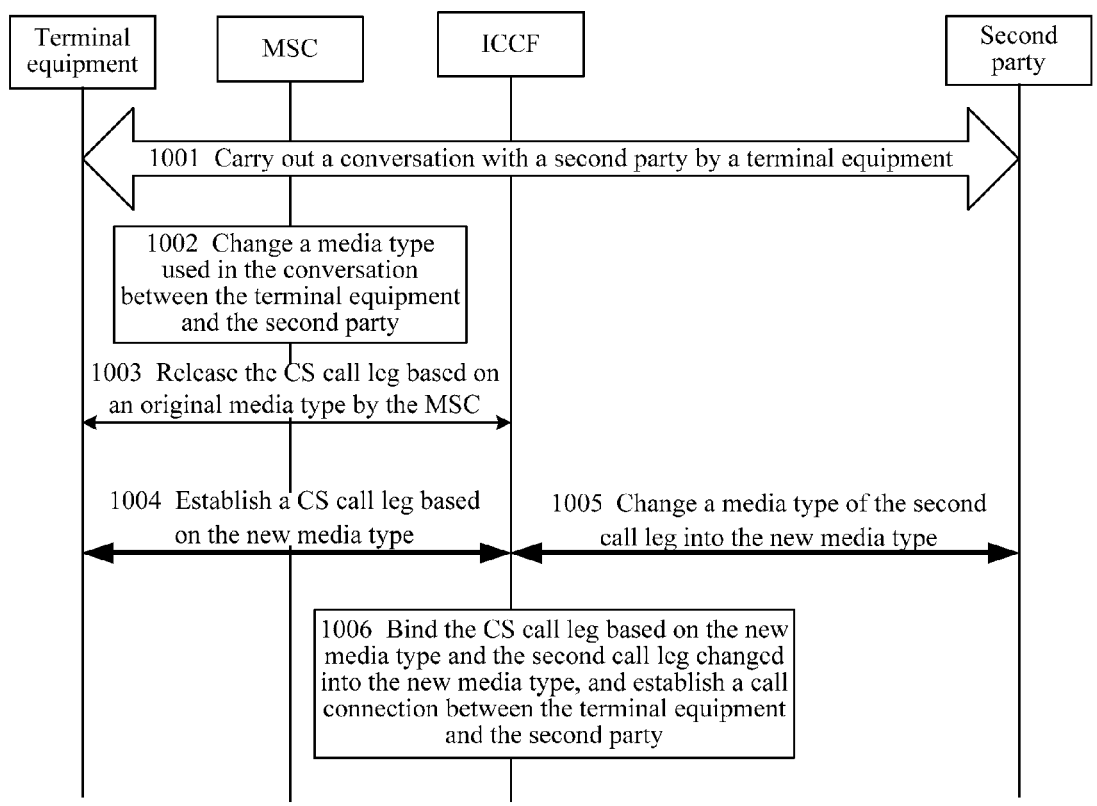
FIG. 10 is a flow chart of a method for controlling a call according to a ninth embodiment of the invention.

A signaling flow chart of a method for controlling a call according to a ninth embodiment is shown in FIG. 10. The method includes the following steps.

In Step 1001, a terminal equipment carries out a conversation with a second party through a CS call leg established between the terminal equipment and an ICCF and a second call leg established between the ICCF and the second party.

In Step 1002, an MSC serving the terminal equipment changes a media type used in the conversation between the terminal equipment and the second party.

It is understood that, the MSC may lower the session quality of a certain call connection to release more resources in case of network overload or resource shortage, for example, change a VP media type into a voice media type, or recover the original media type after the network is restored to its normal state, for example, change the VP media type into the voice media type.

In Step 1003, the MSC releases the CS call leg established between the terminal equipment and the ICCF.

In this embodiment, the releasing the CS call leg by the MSC may be implemented as follows.

The MSC initiates call release requests to the terminal equipment and the ICCF respectively.

The MSC receives response messages from the terminal equipment and the ICCF and releases the CS call leg.

In Step 1004, the terminal equipment establishes a CS call leg based on the new media type with the ICCF.

The establishing the CS call leg based on the new media type may refer to Step 204 of the first embodiment and Step 505 of the fourth embodiment.

In Step 1005, a media type of the second call leg established between the ICCF and the second party is changed into the new media type.

The changing the media type of the second call leg into the new media type may refer to Step 205 of the first embodiment and Step 505 of the fourth embodiment.

In Step 1006, the ICCF establishes a call connection between the terminal equipment and the second party by binding the CS call leg based on the new media type and the second call leg changed into the new media type.

The difference between the ninth embodiment and the first and the fourth embodiment lies in that, the change of the media type is triggered by the MSC that serves the terminal equipment in the ninth embodiment.

Figure 11:
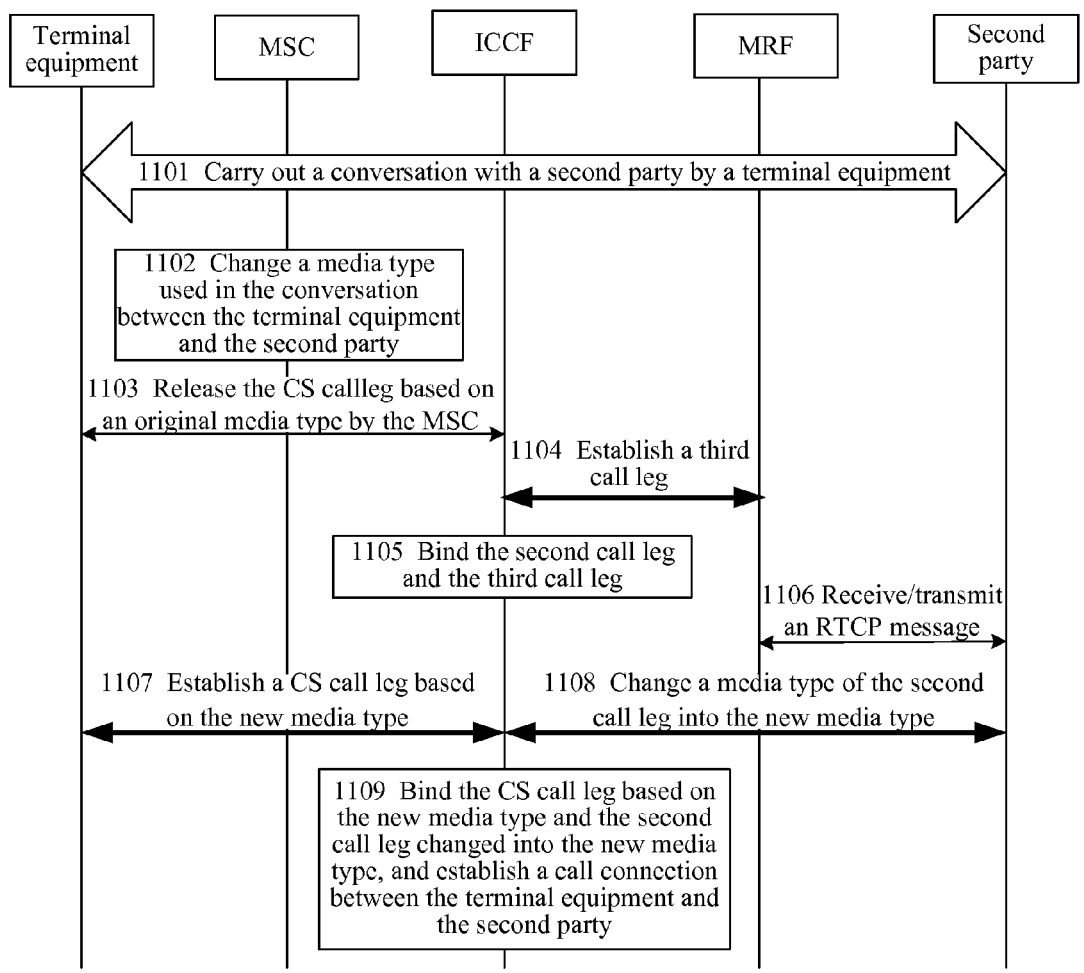
FIG. 11 is a flow chart of a method for controlling a call according to a tenth embodiment of the invention.

A signaling flow chart of a method for controlling a call according to a tenth embodiment is shown in FIG. 11. The method includes the following steps.

In Step 1101, a terminal equipment carries out a conversation with a second party through a CS call leg established between the terminal equipment and an ICCF and a second call leg established between the ICCF and the second party.

In Step 1102, an MSC serving the terminal equipment changes a media type used in the conversation between the terminal equipment and the second party.

In Step 1103, the MSC releases the CS call leg established between the terminal equipment and the ICCF.

In this embodiment, the releasing the CS call leg by the MSC may be implemented as follows.

The MSC initiates call release requests to the terminal equipment and the ICCF respectively.

The MSC receives corresponding messages from the terminal equipment and the ICCF and releases the CS call leg.

In Step 1104, the ICCF establishes a third call leg with an MRF.

In Step 1105, the ICCF binds the second call leg and the third call leg.

In Step 1106, the MRF receives/transmits an RTCP message with the second party through the third call leg and the second call leg.

It is understood that, Steps 1104 to 1106 may also be replaced as: notifying, by the ICCF, a media gateway control function entity to control a media gateway to receive/transmit an RTCP message with the second party as a media endpoint temporarily.

In Step 1107, the terminal equipment establishes a CS call leg based on the new media type with the ICCF.

The establishing the CS call leg based on the new media type may refer to Step 204 of the first embodiment and Step 505 of the fourth embodiment.

In Step 1108, a media type of the second call leg established between the ICCF and the second party is changed into the new media type.

The changing the media type of the second call leg into the new media type may refer to Step 205 of the first embodiment and Step 505 of the fourth embodiment.

In Step 1109, the ICCF establishes a call connection between the terminal equipment and the second party by binding the CS call leg based on the new media type and the second call leg changed into the new media type.

The difference between the tenth embodiment of the invention and the ninth embodiment lies in that a third party replaces the terminal equipment to receive/transmit the RTCP message with the second party, which avoids the release of the call leg between the ICCF and the second party due to too-long reestablishment time during the reestablishment of the CS call leg and ensures the stability of the second call leg when the CS leg is reestablished, so that the method of this embodiment is more practical.

Figure 12:
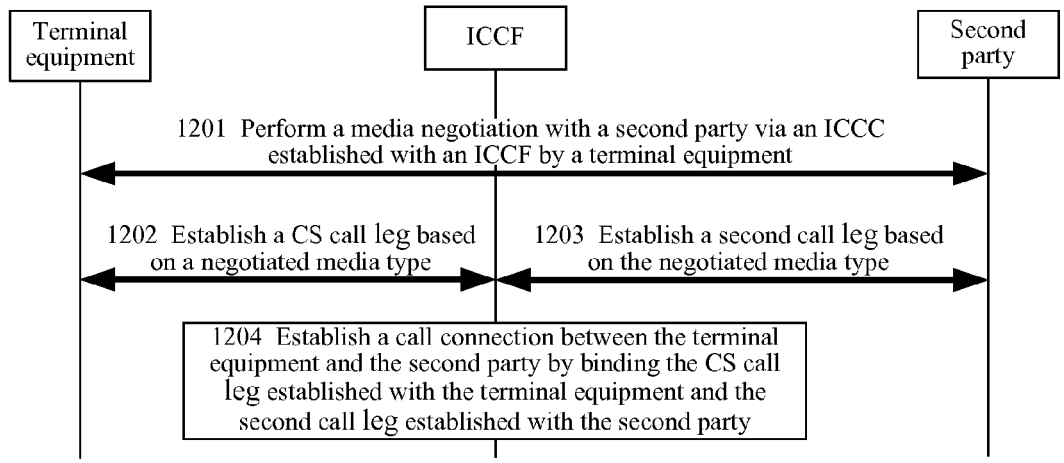
FIG. 12 is a flow chart of a method for controlling a call according to an eleventh embodiment of the invention.

A signaling flow chart of a method for controlling a call according to an eleventh embodiment is shown in FIG. 12. The method includes the following steps:

In Step 1201, a terminal equipment performs a media negotiation with a second party via an ICCC established with an ICCF.

The performing the media negotiation with the second party via the ICCC established with the ICCF by the terminal equipment may be implemented as follows:

The terminal equipment establishes the ICCC with the ICCF.

The terminal equipment sends an identity of the second party and a media type of a call connection requested to be established with the second party to the ICCF via the ICCC.

The ICCF sends a session invitation message including the media type to the second party through the identity of the second party.

The second party returns a media type change request including a new media type to the ICCF.

In this embodiment, the media type change request may be sent through a provisional response message. It is understood that, the message bearing the media type change request may be of various kinds, and the specific message type and message qualification may not limit the invention.

The ICCF returns the new media type to the terminal equipment via the ICCC.

The terminal equipment returns an acknowledgement message to the ICCF via the ICCC to accept the new media type.

The ICCF returns an acknowledgement message of the media type change request to the second party to acknowledge that the terminal equipment accepts the new media type.

It is understood that, the acknowledgement message of the media type change request may be borne by a provisional response acknowledgement message.

The performing the media negotiation with the second party via the ICCC established with the ICCF by the terminal equipment may also be implemented as follows:

The ICCF receives a session invitation of the second party including an identity of the terminal equipment and a media type of the call requested to be established by the second party.

The ICCF establishes the ICCC with the called terminal through the identity.

The ICCF sends the media type to the terminal equipment via the ICCC.

The terminal equipment sends a media type change request including a new media type to the ICCF via the ICCC.

The ICCF returns the media type change request including the new media type to the second party.

Here, the media type change request may be sent through a provisional response message. It is understood that, the message bearing the media type change request may be of various kinds, and the specific message type and message qualification may not limit the invention.

The second party returns an acknowledgement message of the media type change request to the ICCF to accept the new media type.

It is understood that, the acknowledgement message of the media type change request may be borne by a provisional response acknowledgement message.

The ICCF notifies the terminal equipment that the called party accepts the new media type.

It is understood that, the media negotiation performed by the ICCF as an agent of the terminal equipment with the second party via the ICCC may also be implemented in a variety of other manners, and the terminal equipment may perform multiple negotiations with the second party via the ICCC. The present invention emphasizes the media negotiation to be performed via the ICCC before the call is set up, and the specific negotiation manner and the number of negotiations may not limit the invention.

In Step 1202, the ICCF establishes a CS call leg based on a negotiated media type with the terminal equipment.

The establishing the CS call leg may refer to Step 204 of the first embodiment of the invention and Step 505 of the fourth embodiment of the invention.

In Step 1203, the ICCF establishes a second call leg based on the negotiated media type with the second party.

In this embodiment, Steps 1202 and 1203 may be performed synchronously. For example, according to different calling initiators, if the terminal equipment is the initiator of the call, first, the terminal equipment sends a setup request for a CS call leg to the ICCF, after receiving the setup request, the ICCF establishes the second call leg between the ICCF and the second party, and after the second call leg is established, the ICCF returns an acknowledgement message to the terminal equipment to complete the establishment of the CS call leg. If the second party is the initiator of the call, the flow is exactly the opposite. First, the second party sends a setup request for a second call leg to the ICCF, after receiving the setup request, the ICCF establishes the CS call leg between the ICCF and the terminal equipment, and after the CS call leg is established, the ICCF returns an acknowledgement message to the second party to complete the establishment of the second call leg.

In Step 1204, the ICCF establishes a call connection between the terminal equipment and the second party by binding the CS call leg established with the terminal equipment and the second call leg established with the second party.

During the above call setup, Step 1204 may be performed to complete the binding of the call legs, and the binding mainly includes realizing a media connection between the terminal equipment and the second party.

In the eleventh embodiment of the invention, before the call is set up, the ICCF performs the media negotiation with the second party via the ICCC, and both the CS call leg between the terminal equipment and the ICCF and the second call leg between the ICCF and the second party are established by using the negotiated media type. In this manner, the call setup failure resulted from the inconsistent media types requested by both parties of the call and the CS network not supporting the media type change during the process of setting up the call in the conventional art is avoided, and the user's service experience is enhanced, so that the entire call setup process is more optimized and reasonable.

Figure 13:
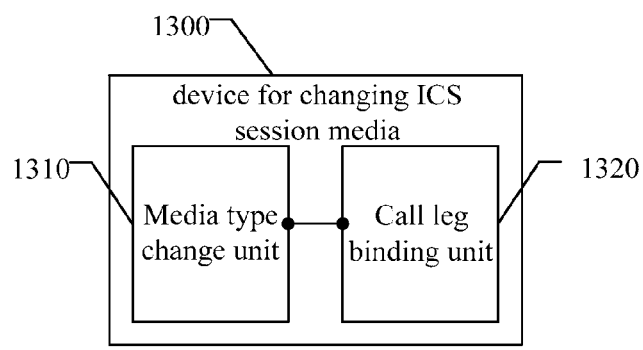
FIG. 13 is a schematic view illustrating a logical structure of a device for changing ICS session media according to a twelfth embodiment of the invention.

A schematic view illustrating a logical structure of a device for changing ICS session media 1300 according to a twelfth embodiment is shown in FIG. 13. The ICS session media change device 1300 includes a media type change unit 1310 and a call leg binding unit 1320.

The media type change unit 1310 is adapted to release a call leg based on an original media type established between the ICCF and the terminal equipment, reestablish a CS call leg based on the new media type between the ICCF and the terminal equipment, and change a media type of a second call leg established between the ICCF and the second party into the new media type after the terminal equipment or the second party changes a media type used in a conversation.

The call leg binding unit 1320 is adapted to reestablish a call connection between the terminal equipment and the second party by binding the CS call leg based on the new media type established with the terminal equipment and the second call leg changed into the new media type.

Figure 14:
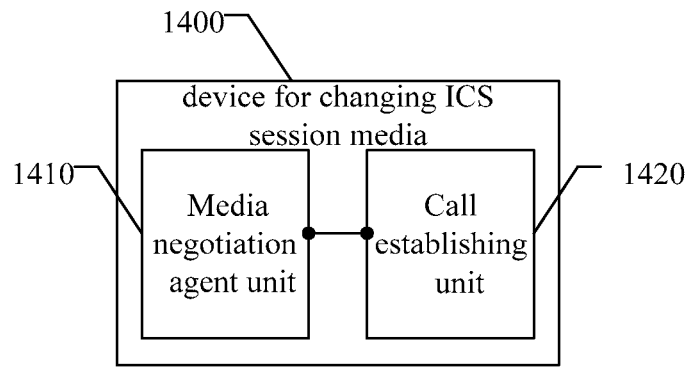
FIG. 14 is a schematic view illustrating a logical structure of a device for changing ICS session media according to a thirteenth embodiment of the invention.

A schematic view illustrating a logical structure of a device for changing ICS session media according to a thirteenth embodiment is shown in FIG. 14. The device for changing ICS session media includes a media negotiation agent unit 1410 and a call establishing unit 1420.

The media negotiation agent unit 1410 is adapted to control a terminal equipment to perform a media negotiation with a second party via an ICCC.

The call establishing unit 1420 is adapted to establish a CS call leg based on a negotiated media type between an ICCF and the terminal equipment, establish a second call leg based on the negotiated media type between the ICCF and the second party, and establish a call connection between the terminal equipment and the second party by binding the CS call leg established with the terminal equipment and the second call leg established with the second party.

Figure 15:
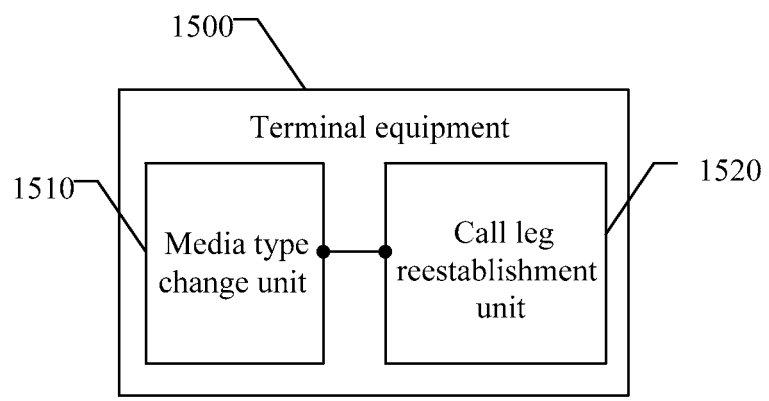
FIG. 15 is a schematic view illustrating a logical structure of a terminal equipment according to a fourteenth embodiment of the invention.

A schematic view illustrating a logical structure of a terminal equipment 1500 according to a fourteenth embodiment is shown in FIG. 15. The terminal equipment 1500 includes a media type change unit 1510 and a call leg reestablishment unit 1520.

The media type change unit 1510 is adapted to change a media type used in a conversation with the second party.

The call leg reestablishment unit 1520 is adapted to release a CS call leg based on an original media type established between the terminal equipment and an ICCF, and establish a CS call leg based on the changed new media type between the terminal equipment and the ICCF after the media type change unit changes the media type.

Figure 16:
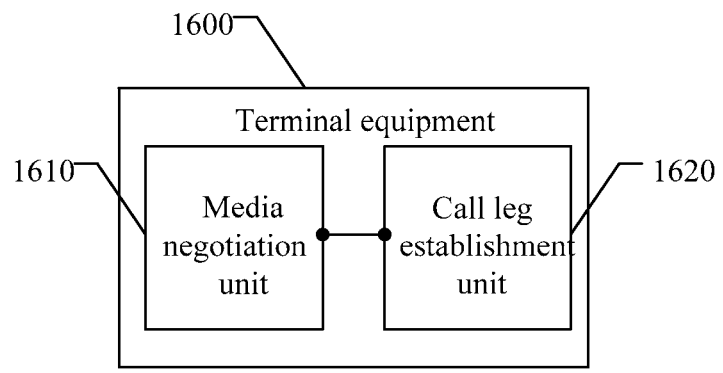
FIG. 16 is a schematic view illustrating a logical structure of a terminal equipment according to a fifteenth embodiment of the invention.

A schematic view illustrating a logical structure of a terminal equipment 1600 according to a fifteenth embodiment is shown in FIG. 16. The terminal equipment 1600 includes a media negotiation unit 1610 and a call leg establishment unit 1620.

The media negotiation unit 1610 is adapted to perform a media negotiation with a second party via an ICCC established with an ICCF.

The call leg establishment unit 1620 is adapted to establish a CS call leg based on a media type after the media negotiation with the ICCF.

Figure 17:
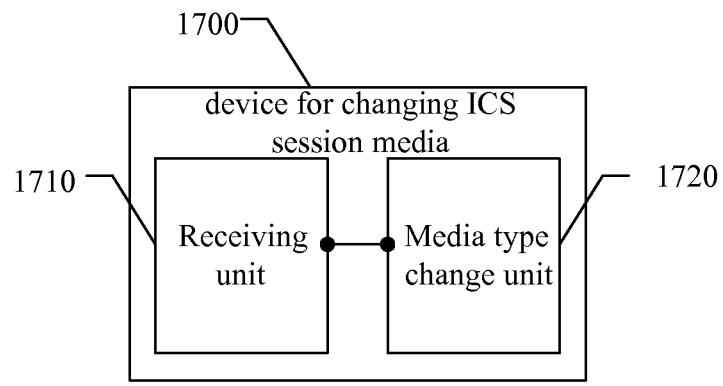
FIG. 17 is a schematic view illustrating a logical structure of a device for changing ICS session media according to a sixteenth embodiment of the invention.

A schematic view illustrating a logical structure of a device for changing ICS session media device 1700 according to a sixteenth embodiment is shown in FIG. 17. The ICS session media change device 1700 includes a receiving unit 1710 and a media type change unit 1720.

The receiving unit 1710 is adapted to receive a media type change request including a new media type sent from a terminal equipment or an MSC or a second party.

The media type change unit 1720 is adapted to release a CS call leg based on an original media type established between the ICCF and the terminal equipment, reestablish a CS call leg based on the new media type between the ICCF and the terminal equipment, and update a media type of a second call leg between the ICCF and the second party to the new media type after the receiving unit 1710 receives the media type change request.

The device for changing ICS session media further includes a determination unit and a modification unit.

The determination unit is adapted to determine whether a CS network in which the terminal equipment is located supports an SCUDIF, and if the CS network in which the terminal equipment is located supports the SCUDIF, instruct the media type change unit 1720 to release the call leg based on the original media type established between the ICCF and the terminal equipment; otherwise, send the result to the modification unit.

The modification unit is adapted to modify the CS call leg based on the original media type into the CS call leg based on the new media type by using the SCUDIF, and instruct the media type change unit 1720 to update the media type of the second call leg between the ICCF and the second party into the new media type.

Figure 18:
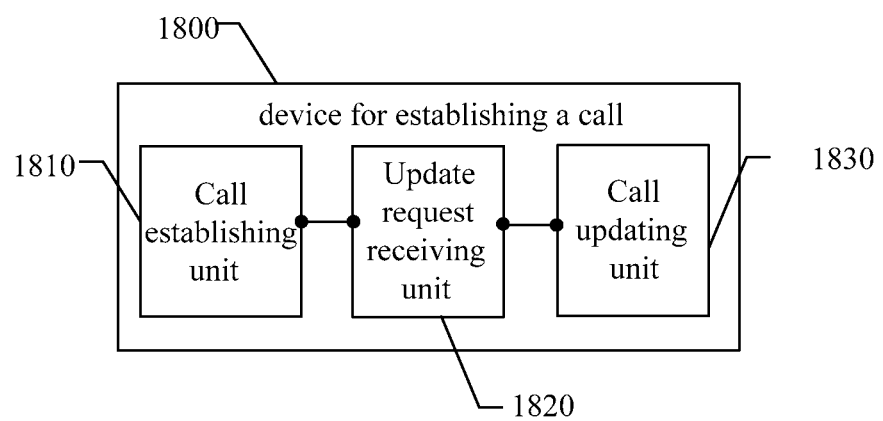
FIG. 18 is a schematic view illustrating a logical structure of a device for establishing a call according to a seventeenth embodiment of the invention.

A schematic view illustrating a logical structure of a device 1800 for establishing a call according to a seventeenth embodiment is shown in FIG. 18. The device 1800 for establishing a call includes a call establishing unit 1810, an update request receiving unit 1820, and a call updating unit 1830.

The call setup unit 1810 is adapted to establish a CS call leg based on an original media type between an ICCF and a terminal equipment and request a second party to establish a second call leg based on the original media type.

The update request receiving unit 1820 is adapted to receive a media type change request including a new media type sent from the second party.

The call update unit 1830 is adapted to release the CS call leg based on the original media type established between the ICCF and the terminal equipment, establish a CS call leg based on the new media type between the ICCF and the terminal equipment, and establish a second call leg based on the new media type between the ICCF and the second party after the update request receiving unit 1820 receives the media type change request.

The device 1800 for establishing a call further includes a determination unit and a modification unit.

The determination unit is adapted to determine whether a CS network in which the terminal equipment is located supports an SCUDIF, and if the CS network in which the terminal equipment is located supports the SCUDIF, instruct the call update unit 1830 to release the call leg based on the original media type established between the ICCF and the terminal equipment; otherwise, send the result to a modification unit.

The modification unit is adapted to modify the CS call leg based on the original media type into the CS call leg based on the new media type by using the SCUDIF, and instruct the call update unit 1830 to establish the second call leg based on the new media type between the ICCF and the second party.

The call control method, the IMS CS control device, and the terminal equipment provided by the present invention are illustrated in detail above.

According to the embodiments of the invention, in the ICS call established by CS, when a change of the media type of the call is triggered, the CS call leg based on the original media type established between the terminal equipment and the ICCF is released, the CS call leg based on the new media type is reestablished between the terminal equipment and the ICCF, and the call connection is established between the terminal equipment and the second party by binding the reestablished CS call leg and the second call leg established between the ICCF and the second party, thereby changing the media type in the ICS call established by CS. As the mechanism of reestablishing a call leg is employed in the CS network, compared with the conventional art, the requirements for the CS network are lowered, the large-scale upgrade of the CS network equipments in the existing technical scheme is avoided, the network construction cost is reduced, and the network universality is enhanced.

Further, in the embodiments of the invention, it is determined whether the CS network supports the SCUDIF feature or not, and if the CS network supports the SCUDIF feature, it is learned that the CS switched network in which the terminal equipment is located supports a media change and thus the media type of the CS call leg established between the terminal equipment and the ICCF can be changed into the new media type in a media change manner supported by R5, so as to accelerate the media conversion.

In the embodiments of the invention, a third party replaces the terminal equipment to receive/transmit the RTCP message with the second party, which avoids the release of the call leg between the ICCF and the second party due to too-long reestablishment time during the reestablishment of the CS call leg and ensures the stability of the second call leg when the CS leg is reestablished, so that the method of this embodiment is more practical.

Moreover, in the embodiments of the invention, before the call is set up, the ICCF performs the media negotiation with the second party via the ICCC, and both the CS call leg between the terminal equipment and the ICCF and the second call leg between the ICCF and the second party are established by using the negotiated media type. In this manner, the call setup failure resulted from the inconsistent media types requested by both parties of the call and the CS network not supporting the media type change during the process of setting up the call in the conventional art is avoided, and the user's service experience is enhanced, so that the entire call setup process is more optimized and reasonable.

It is apparent to those of ordinary skill in the art that modifications and variations can be made to the specific implementation and application scope according to the ideas of the present invention. To sum up, the content of the specification is not intended to limit the invention.

The invention claimed is:

1. A method for changing IP multimedia sub-system (IMS) centralized service (ICS) session media, comprising:
controlling a media negotiation between a terminal equipment and a second party via an established IMS circuit-switched (CS) control channel (ICCC);
establishing a CS call leg based on a negotiated media type between an IMS CS control function (ICCF) and the terminal equipment;
establishing a second call leg based on the negotiated media type between the ICCF and the second party;
binding the CS call leg established with the terminal equipment and the second call leg established with the second party, and establishing a call connection between the terminal equipment and the second party;

wherein the step of controlling the media negotiation between the terminal equipment and the second party via the established ICCC comprises:

establishing, by the terminal equipment, the ICCC with the ICCF;

sending, by the terminal equipment, an identity of the second party and a media type of a request to establish the call connection with the second party to the ICCF via the ICCC;

sending, by the ICCF, a session invitation message comprising the media type to the second party through the identity of the second party;

returning, by the second party, a media type change request comprising a new media type to the ICCF;

returning, by the ICCF, the new media type to the terminal equipment via the ICCC;

returning, by the terminal equipment, an acknowledgement message to the ICCF via the ICCC, wherein the acknowledgement message indicates an acceptance of the new media type; and determining, by the ICCF, whether a CS network in which the terminal equipment is located supports a service change and unrestricted digital information (UDI) fallback (SCUDIF), and if the CS network in which the terminal equipment is located does not support the SCUDIF, performing, by the ICCF, the step of releasing the CS call leg based on the media type established with the terminal equipment; if the CS network in which the terminal equipment is located supports the SCUDIF, modifying, by the ICCF, the CS call leg based on the media type into the CS call leg based on the new media type by using SCUDIF;

returning, by the ICCF, an acknowledgement message of the media type change request to the second party to acknowledge that the terminal equipment accepts the new media type.

2. A non-transitory computer readable storage medium, comprising:

computer program codes which when executed by a computer processor cause the computer processor to execute the following steps:

controlling a media negotiation between a terminal equipment and a second party via an established IMS circuit-switched (CS) control channel (ICCC);

establishing a CS call leg based on a negotiated media type between an IMS CS control function (ICCF) and the terminal equipment;

establishing a second call leg based on the negotiated media type between the ICCF and the second party;

binding the CS call leg established with the terminal equipment and the second call leg established with the second party, and establishing a call connection between the terminal equipment and the second party;

wherein the step of controlling the media negotiation between the terminal equipment and the second party via the established ICCC comprises:

establishing, by the terminal equipment, the ICCC with the ICCF;

sending, by the terminal equipment, an identity of the second party and a media type of a request to establish the call connection with the second party to the ICCF via the ICCC;

sending, by the ICCF, a session invitation message comprising the media type to the second party through the identity of the second party;

returning, by the second party, a media type change request comprising a new media type to the ICCF;

returning, by the ICCF, the new media type to the terminal equipment via the ICCC;

returning, by the terminal equipment, an acknowledgement message to the ICCF via the ICCC, wherein the acknowledgement message indicates an acceptance of the new media type; and determining, by the ICCF, whether a CS network in which the terminal equipment is located supports a service change and unrestricted digital information (UDI) fallback (SCUDIF), and if the CS network in which the terminal equipment is located does not support the SCUDIF, performing, by the ICCF, the step of releasing the CS call leg based on the media type established with the terminal equipment; if the CS network in which the terminal equipment is located supports the SCUDIF, modifying, by the ICCF, the CS call leg based on the media type into the CS call leg based on the new media type by using SCUDIF;

returning, by the ICCF, an acknowledgement message of the media type change request to the second party to acknowledge that the terminal equipment accepts the new media type. This listing of claims replaces all prior versions, and listings, of claims in the application.

* * * * *